(12) United States Patent
Degenkolb

(10) Patent No.: US 10,131,193 B2
(45) Date of Patent: Nov. 20, 2018

(54) DEPLOYABLE TOW HOOK ASSEMBLY AND METHOD

(71) Applicant: FORD GLOBAL TECHNOLOGIES, LLC, Dearborn, MI (US)

(72) Inventor: Jay Robert Degenkolb, Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/455,186

(22) Filed: Mar. 10, 2017

(65) Prior Publication Data

US 2018/0257445 A1    Sep. 13, 2018

(51) Int. Cl.
| | | |
|---|---|---|
| *B60D 1/54* | (2006.01) | |
| *B60D 1/44* | (2006.01) | |
| *B60D 1/48* | (2006.01) | |
| *B60D 1/56* | (2006.01) | |

(52) U.S. Cl.
CPC .............. *B60D 1/54* (2013.01); *B60D 1/488* (2013.01); *B60D 1/565* (2013.01)

(58) Field of Classification Search
CPC . B60D 1/14; B60D 1/44; B60D 1/485; B60D 1/565; B60D 1/54; B60D 1/56; B60D 1/488; F16B 21/09; F16B 21/16; F16B 21/06
USPC ............. 293/28, 106, 120; 280/491.1, 491.2, 280/491.5, 495, 504; 403/378, 379.2, 403/379.5; 224/521
See application file for complete search history.

(56) References Cited

U.S. PATENT DOCUMENTS

| | | | | |
|---|---|---|---|---|
| 2,914,343 | A * | 11/1959 | Roth | B60D 1/54 280/491.2 |
| 2,959,427 | A * | 11/1960 | Keese | B60D 1/50 267/152 |
| 3,249,973 | A * | 5/1966 | Seckerson | B60R 13/0206 24/297 |
| 4,072,113 | A * | 2/1978 | Thurston | B60P 7/0876 24/115 K |
| 4,269,428 | A | 5/1981 | Rexine | |
| 6,189,910 | B1 * | 2/2001 | Bartel | B60D 1/06 280/491.1 |
| 6,196,758 | B1 * | 3/2001 | Scarborough | F16B 21/09 403/109.3 |
| 6,312,004 | B1 * | 11/2001 | Kiss | B60D 1/06 280/432 |
| 6,394,512 | B1 | 5/2002 | Schuster et al. | |
| 7,441,793 | B1 * | 10/2008 | Lim | B60D 1/00 280/504 |
| 7,753,396 | B2 | 7/2010 | Jamieson et al. | |

(Continued)

FOREIGN PATENT DOCUMENTS

| | | | |
|---|---|---|---|
| CH | 348055 | * | 7/1960 |
| DE | 3612206 | * | 10/1987 |

(Continued)

*Primary Examiner* — Anne Marie M Boehler
(74) *Attorney, Agent, or Firm* — Jason Rogers; King & Schickli, PLLC

(57) ABSTRACT

A tow hook assembly includes a bracket and a tow loop carried on the bracket. The bracket includes a guide track. The tow loop is displaceable along the guide track between a retracted position and a deployed position. A method of deploying a tow loop is also disclosed.

11 Claims, 6 Drawing Sheets

(56) References Cited

U.S. PATENT DOCUMENTS

| | | | | |
|---|---|---|---|---|
| 8,371,602 B1* | 2/2013 | Peschansky | ............. | B60D 1/04 280/446.1 |
| 9,114,679 B2 | 8/2015 | Hood et al. | | |
| 2006/0087101 A1* | 4/2006 | Yon | ........................ | B60D 1/07 280/504 |
| 2007/0024027 A1* | 2/2007 | Pratt | ..................... | B60D 1/565 280/495 |
| 2008/0284134 A1* | 11/2008 | Temple | ................... | B60D 1/00 280/495 |

FOREIGN PATENT DOCUMENTS

| | | | |
|---|---|---|---|
| DE | 102010015179 | * | 12/2010 |
| DE | 202015105094 | * | 12/2015 |
| EP | 2248688 | * | 3/2010 |
| EP | 2650149 A1 | | 10/2013 |
| FR | 2776240 | * | 9/1999 |

* cited by examiner

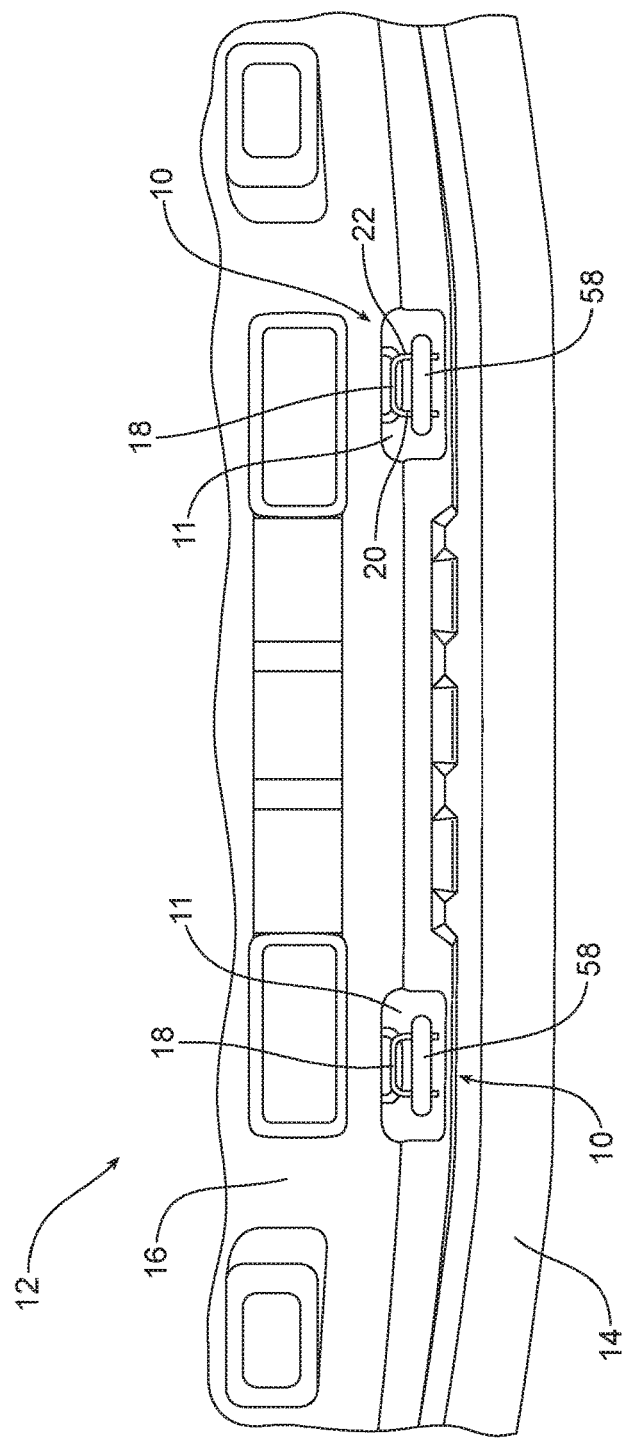

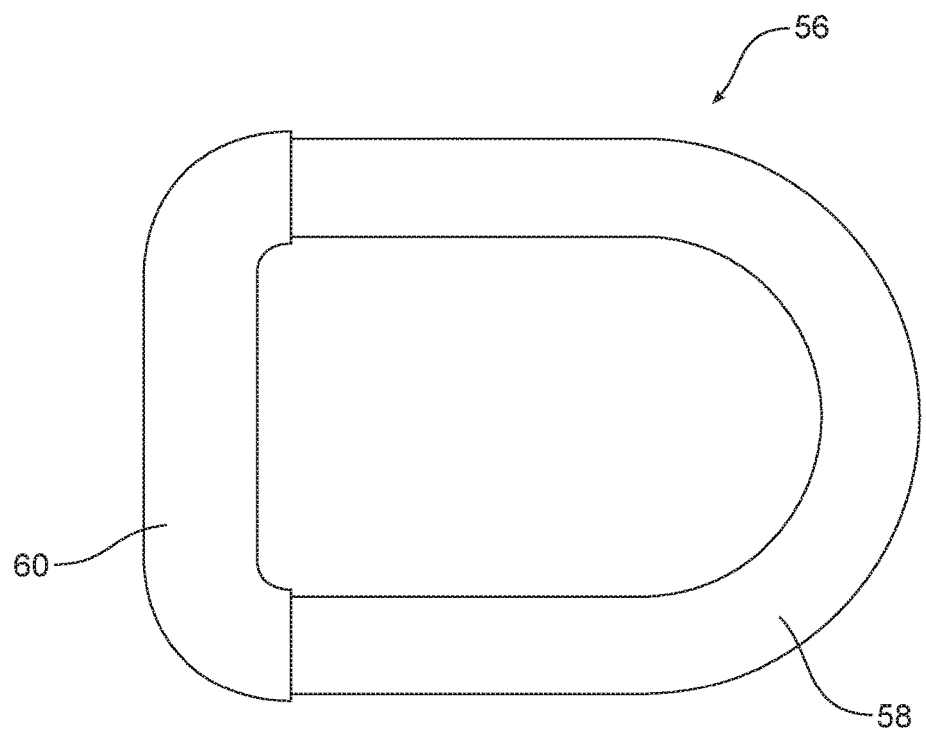

DEPLOYABLE TOW HOOK ASSEMBLY AND METHOD

TECHNICAL FIELD

This document relates generally to the motor vehicle equipment field and, more particularly, to a tow hook assembly as well as to a related method of deploying a tow hook.

BACKGROUND

Tow hooks on the front of a motor vehicle, such as a pickup truck or sport utility vehicle (SUV), are used for towing or recovering items with a strap, chain or other hardware. State of the art rigid tow hooks on motor vehicles are exposed and project from the front fascia/bumper for ease of reach/function. Recent government standards for pedestrian protection require that all rigid items on the front end of a motor vehicle be recessed behind the front fascia/bumper in order to prevent injury to a pedestrian from the rigid item in the event of a pedestrian frontal impact.

This document relates to a deployable tow hook assembly that meets the seemingly conflicting requirements for ease of use provided by a traditional tow hook while simultaneously protecting pedestrians from a tow hook impact injury.

SUMMARY

In accordance with the purposes and benefits described herein, a tow hook assembly is provided. That tow hook assembly comprises a bracket including a guide track and a tow hook carried on the bracket. The tow hook is displaceable along the guide track between a retracted position and a deployed position.

The bracket may include a first wall segment and a second wall segment opposite the first wall segment. The bracket may have a U-shaped cross section. In other embodiments, the bracket could have a fully closed cross section.

The guide track may include two matching guides provided in the bracket. More specifically, the guide track may include a first guide in the first wall segment and a second guide in the second wall segment.

The first guide may include a first end, a first intermediate section and a second end. A first neck may be provided between the first end and the first intermediate section. Similarly, a second neck may be provided between the second end and the first intermediate section.

The second guide may include a third end, a second intermediate section and a fourth end. A third neck may be provided between the third end and the second intermediate section. A fourth neck may be provided between the fourth end and the second intermediate section.

The tow hook may include a main body and a sleeve on the main body. The sleeve may be made from a low friction material and slides in the first guide and the second guide. The main body of the tow hook may form a closed loop. Further, the main body may be made from steel and the sleeve may be made from nylon.

In accordance with an additional aspect, a method is provided of deploying a tow hook. That method broadly comprises the step of sliding the tow hook from a retracted position to a deployed position. Further, the method may include translating the tow hook along a substantially straight line.

Still further, the method of deploying a tow hook may comprise sliding the tow hook along a guide track in a bracket in order to displace the tow hook from a retracted position into a deployed position. Further, the method may include the step of providing the tow hook with a sleeve of low-friction material to promote smooth sliding action. The method may also include the step of providing at least one neck in the guide track to hold the tow hook in the retracted position and the deployed position.

In the following description, there are shown and described several preferred embodiments of the tow hook assembly as well as the related method of deploying a tow hook. As it should be realized, the tow hook assembly and related method are capable of other, different embodiments and their several details are capable of modification in various, obvious aspects all without departing from the tow loop assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the tow hook assembly and related method of deploying a tow hook and together with the description serve to explain certain principles thereof.

FIG. 1 is a detailed front plan view of a motor vehicle equipped with two separate tow hook assemblies.

FIG. 4 is a detailed plan view of the tow hook of the tow hook assembly clearly illustrating the nylon sleeve provided on the main body of the tow hook.

Figure 2A:
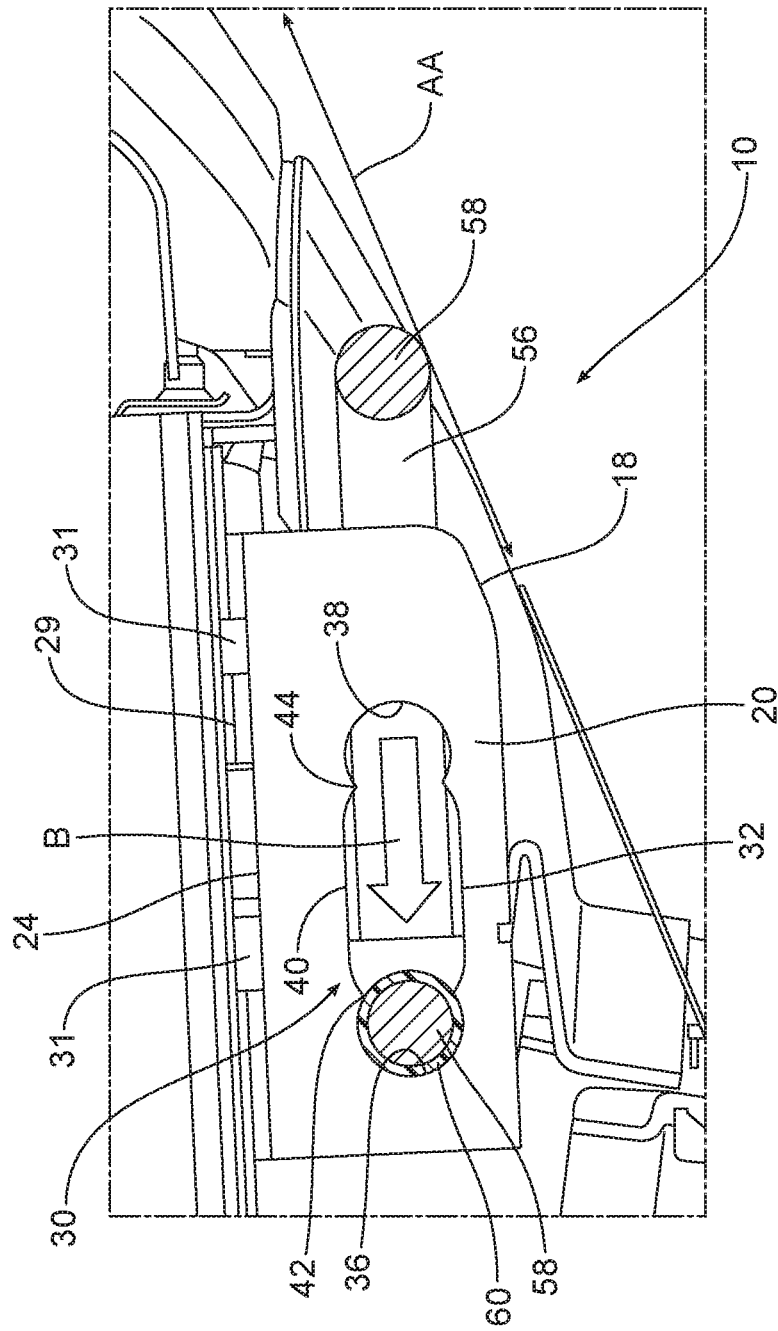
FIG. 2a is a cross sectional view of one of the tow hook assemblies illustrating the tow hook assembly in the retracted position behind the approach angle of the motor vehicle.

Reference will now be made in detail to the present preferred embodiments of the tow hook assembly, examples of which are illustrated in the accompanying drawing figures.

DETAILED DESCRIPTION

Reference is now made to FIG. 1 illustrating two tow hook assemblies 10. Each tow hook assembly 10 is carried in a cavity 11 at the front of a motor vehicle 12 between the front bumper 14 and the front fascia 16.

As illustrated in FIGS. 1-4, each tow hook assembly 10 includes a bracket 18 having a substantially U-shaped cross section. Each bracket 18 includes a first wall segment 20 and a second wall segment 22 opposite of the first wall segment. A third wall segment 24 connects the first wall segment 20 and the second wall segment 22. The third wall segment 24 includes a mounting aperture 26 and a keyhole slot 28 for mounting the tow hook assembly 10 to a support surface 29 such as the frame or other structure of a motor vehicle by means of fasteners 31.

As best illustrated in FIGS. 2a, 2b, 3a and 3b, the bracket 18 includes a guide track 30. In the illustrated embodiment, the guide track 30 comprises a first guide 32 in the first wall segment 20 and a second guide 34 in the second wall segment 22. The first guide 32 and the second guide 34 are aligned and of an identical shape.

Figure 2B:
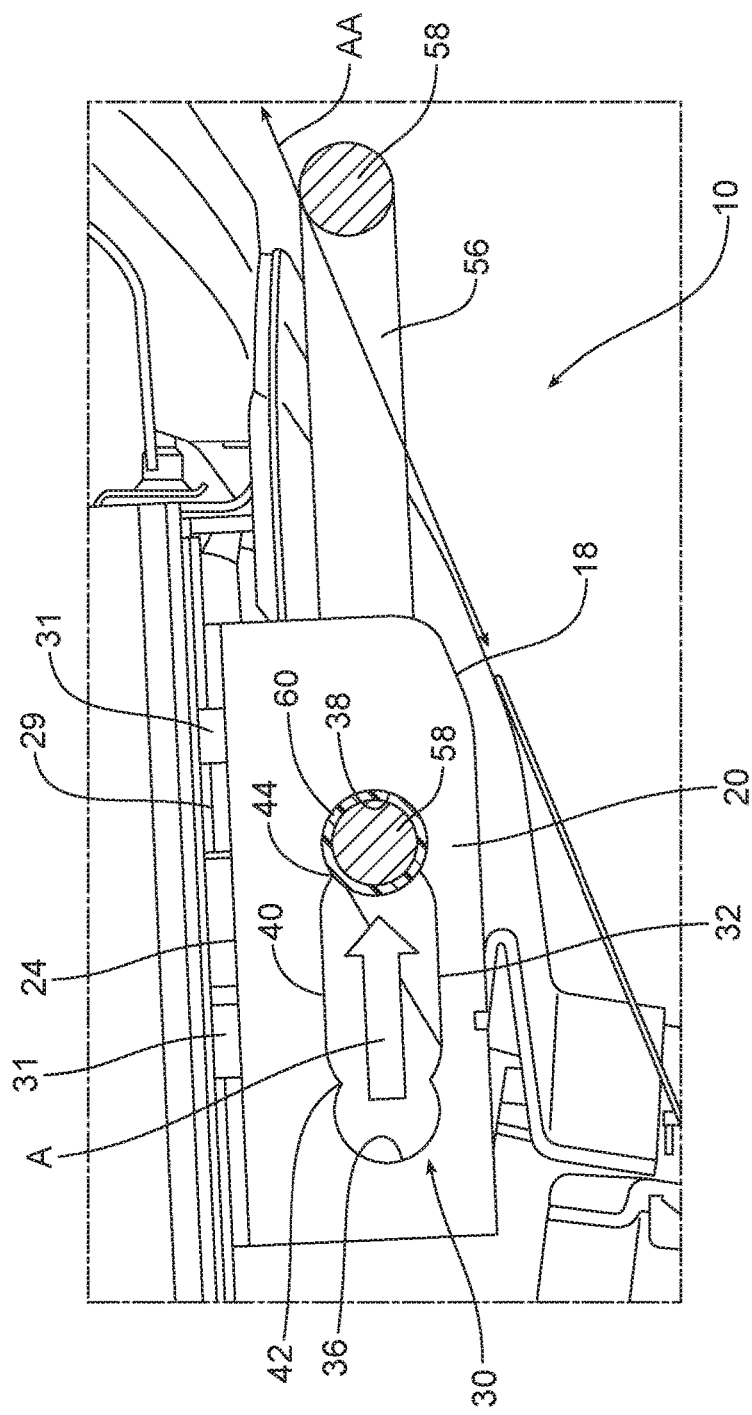
FIG. 2b is a view similar to FIG. 2a but illustrating the tow hook in a deployed position so that a portion of the tow hook projects forward of the approach angle of the motor vehicle.
Figure 3A:
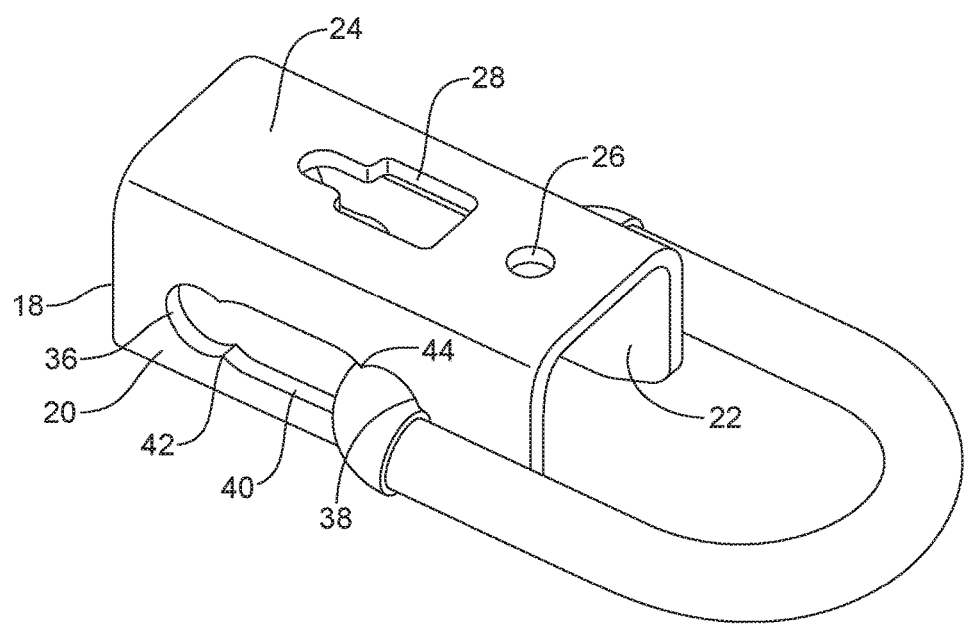
FIG. 3a is a detailed perspective view of the tow hook assembly illustrating the bracket and guide track as well as the tow hook carried on that bracket with that tow hook being shown in the deployed position.

As illustrated in FIGS. 2a, 2b and 3a, the first guide 32 includes a first end 36, a second end 38 and a first intermediate section 40 between the first end 36 and the second end 38. A first neck 42 separates the first end 36 from the first intermediate section 40. A second neck 44 separates the second end 38 from the first intermediate section 40.

Figure 3B:
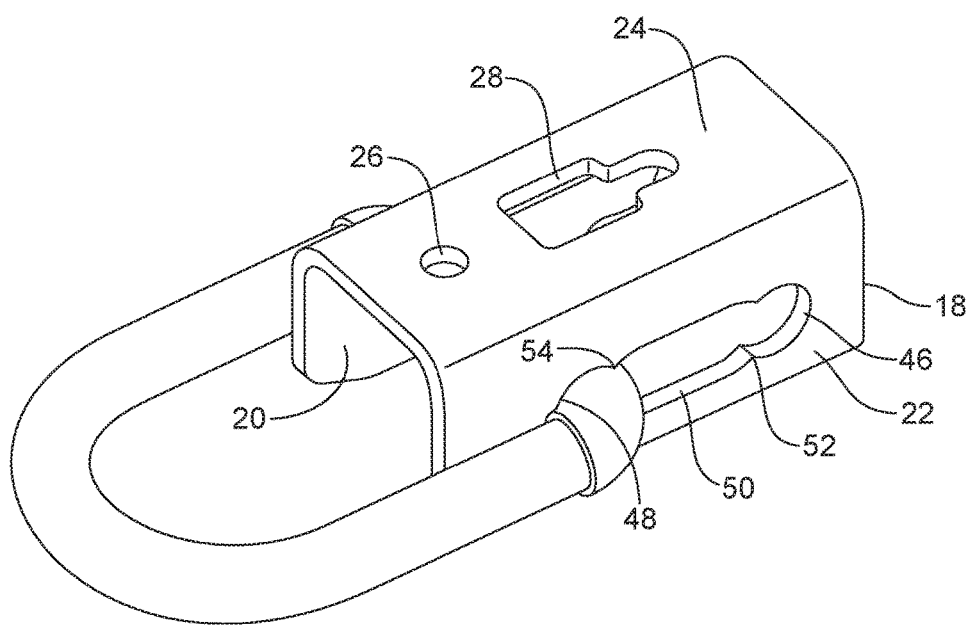
FIG. 3b is a view identical to FIG. 3a but showing the opposite side of the tow hook assembly.

As illustrated in FIGS. 2a, 2b and 3b, the second guide 34 includes a third end 46, a fourth end 48 and a second intermediate section 50 between the third end and the fourth end. A third neck 52 separates the third end 46 from the second intermediate section 50. A fourth neck 54 separates the fourth end 48 from the second intermediate section 50.

Each tow hook assembly 10 also includes a tow loop 56. In the illustrated embodiment, the tow loop 56 comprises a main body 58 that may be made of steel or other appropriate high strength material, and a sleeve 60 received over at least a part of the main body 58. That sleeve 60 may be made from a low friction material such as nylon.

As illustrated in the drawing figures, the main body 58 forms a continuous loop extending through the two matching guides: the first guide 32 and the second guide 34 in the bracket 18. As illustrated, the low friction sleeve 60 on the main body 58 of the tow loop 56 engages the two guides 32, 34 to allow free sliding displacement of the tow loop with respect to the bracket 18 between the retracted position illustrated in FIG. 2a, wherein the tow loop is behind the approach angle AA for the motor vehicle 12 and the deployed position as illustrated in FIG. 2b wherein the front of the tow loop projects forward of the approach angle AA.

As should be appreciated from reviewing FIGS. 2a, 2b, 3a and 3b, when the tow loop 56 is in the retracted position, the low friction sleeve 60 of the tow loop rests in the first end 36 of the first guide 32 and the third end 46 of the second guide 34 with the first neck 42 and the third neck 52 tending to maintain the tow loop in the retracted position.

When one wishes to displace the tow loop 56 from the retracted position to the deployed position, one engages the tow loop with a finger or hook pulling forward in the direction of action arrow A in FIG. 2b. This serves to draw the low friction sleeve 60 of the tow loop past the first neck 42 and the third neck 52, translating the tow loop along a substantially straight line through the first intermediate section 40 and the second intermediate section 50 past the second neck 44 and the fourth neck 54 until the low friction sleeve is received and seated in the second end 38 of the first guide 32 and the fourth end 48 of the second guide 34. The second neck 44 and the fourth neck 54 tend to hold the tow loop 56 in the deployed position where one can connect a strap, chain or other towing hardware to the tow loop in a relatively simple and efficient manner.

When one wishes to return the tow loop 56 back to the retracted position one simply slides the tow loop through the first guide 32 and second guide 34 of the guide track 30 until the low friction sleeve 60 of the tow loop again seats in the first end 36 and third end 46 beyond the first neck 42 and the third neck 52. Note action arrow B in FIG. 2a.

Consistent with the above description, a method is provided of deploying a tow loop 56. That method may be broadly described as comprising the step of sliding the tow loop 56 from a retracted position as illustrated in FIG. 2a to a deployed position as illustrated in FIG. 2b. Thus, as noted above and shown in the drawing figures the method also includes the step of translating the tow loop 56 along a substantially straight line defined by the first guide 32 and second guide 34 of the guide track 30.

Stated another way, the method of deploying the tow loop 56 may comprise sliding the tow loop along the guide track 30 in the bracket 18 in order to displace the tow loop from the retracted position into the deployed position and back again. The method may also include the steps of providing the tow loop 56 with a sleeve 60 of low-friction material to promote smooth sliding action and providing at least one neck 42, 44, 52, 54 in the guide track 30 to hold the tow loop in the respective retracted and deployed positions.

As should be appreciated, the tow hook assembly 10 is relatively inexpensive to produce and easy to use. One may simply displace the tow loop 56 with respect to the bracket 18 between the retracted position illustrated in FIG. 2a and the deployed position illustrated in 2b with a simple sliding motion and action. The low friction sleeve 60 around the tow loop 56 ensures free sliding movement under substantially any foreseeable operating conditions. The necks 42, 44, 52, 54 provided in the guides 32, 34 of the guide track 30 function in the manner of passive detents to help retain the tow loop in either the retracted or deployed positions while still allowing for simple and easy displacement when desired.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A tow hook assembly, comprising:
a bracket including a first wall segment and a second wall segment opposite the first wall segment, said bracket further including a guide track comprising a first guide in the first wall segment and a second guide in the second wall segment, wherein the first guide includes a first rounded end, a first intermediate section defined by two first opposing flat surfaces, a second rounded end, a first neck between said first rounded end and said first intermediate section, and a second neck between said second rounded end and said first intermediate section; and
a tow loop carried on said bracket and linearly displaceable along said guide track between a retracted position in which a portion of the tow loop is engaged by the first rounded end and a deployed position in which a portion of the tow loop is engaged by the second rounded end, wherein said tow loop includes a sleeve that slides along said guide track within at least said first guide.

2. The tow hook assembly of claim 1, wherein said second guide includes a third rounded end, a second intermediate section defined by two second opposing flat surfaces, a fourth rounded end, a third neck between said third rounded end and said second intermediate section and a fourth neck between said fourth rounded end and said second intermediate section.

3. The tow hook assembly of claim 2, wherein said tow loop includes a main body and the sleeve is received over at least a part of said main body.

4. The tow hook assembly of claim 3, wherein said sleeve is made from a low friction material and slides in said first guide and said second guide.

5. The tow hook assembly of claim 4, wherein said main body forms a closed loop.

6. The tow hook assembly of claim 5, wherein said main body is made from steel and said sleeve is made from nylon.

7. The tow loop hook of claim 1, wherein said bracket has a U-shaped cross section.

8. The tow loop hook of claim 1, wherein said guide track further includes a second guide provided in said bracket, said second guide matching the first guide.

9. The tow loop hook of claim 8, wherein said tow loop includes a main body and the sleeve is received over at least a part of said main body.

10. The tow loop hook of claim 9, wherein said sleeve is made from a low friction material and slides along said two matching guides.

11. A method of deploying a tow loop, comprising:

sliding said tow loop linearly along a guide track in a u-shaped mounting bracket in order to displace said tow loop from a retracted position into a deployed position, wherein the guide track sequentially comprises a first rounded end for engaging the tow loop in the retracted position, a first neck of a smaller width than a diameter of the first rounded end, an intermediate section defined by two opposing flat walls, a second neck, and a second rounded end for engaging the tow loop in the deployed position, wherein the second neck is of a smaller width than a diameter of the second rounded end; and providing said tow loop with a sleeve of low-friction material adapted for sliding within the guide track to promote smooth sliding action.

* * * * *